United States Patent
Hewel et al.

(10) Patent No.: US 10,519,938 B2
(45) Date of Patent: Dec. 31, 2019

(54) SPRING DEVICE

(71) Applicant: Stabilus GmbH, Koblenz (DE)

(72) Inventors: Michael Hewel, Boppard (DE);
Karl-Heinz Darscheid, Hillscheid (DE)

(73) Assignee: STABILUS GMBH, Koblenz (DE)

( * ) Notice: Subject to any disclaimer, the term of this patent is extended or adjusted under 35 U.S.C. 154(b) by 0 days.

(21) Appl. No.: 15/695,451

(22) Filed: Sep. 5, 2017

(65) Prior Publication Data

US 2018/0066634 A1 Mar. 8, 2018

(30) Foreign Application Priority Data

Sep. 5, 2016 (DE) .................. 10 2016 116 519

(51) Int. Cl.
| | |
|---|---|
| *F03G 1/10* | (2006.01) |
| *E05F 3/02* | (2006.01) |
| *F16F 13/00* | (2006.01) |
| *F16F 9/02* | (2006.01) |

(52) U.S. Cl.
CPC .................. *F03G 1/10* (2013.01); *E05F 3/02* (2013.01); *F16F 9/0218* (2013.01); *F16F 13/007* (2013.01); *E05Y 2900/50* (2013.01)

(58) Field of Classification Search
CPC .......... F16F 9/02; F16F 9/0209; F16F 9/0218; F16F 9/48; F16F 9/49; F03G 1/10; E05Y 2900/50; E05F 3/02
See application file for complete search history.

(56) References Cited

U.S. PATENT DOCUMENTS

| | | | | |
|---|---|---|---|---|
| 2,992,815 A | * | 7/1961 | Ellis, Jr. .................... | F16F 9/48 188/312 |
| 3,188,072 A | * | 6/1965 | Wustenhagen ....... | F16F 9/0209 267/124 |
| 3,870,287 A | * | 3/1975 | McMahon ............ | F16F 9/0209 267/113 |
| 4,166,522 A | | 9/1979 | Bourcier Carbon | |
| 4,844,392 A | * | 7/1989 | Bauer ...................... | A47C 3/30 248/162.1 |

(Continued)

FOREIGN PATENT DOCUMENTS

| | | |
|---|---|---|
| CA | 2723779 C | 11/2016 |
| CN | 2700639 Y | 5/2005 |

(Continued)

*Primary Examiner* — Vishal R Sahni
(74) *Attorney, Agent, or Firm* — Lucas & Mercanti, LLP

(57) ABSTRACT

A spring device for the motion drive of a movable component from a rest position into a displaced position includes a gas spring and a preloaded spring, the movable component being loaded into the displaced position by a preloaded spring. The gas spring includes a pressurized gas-filled cylinder with a first end closed by a first end plate and a second end closed by a second end plate. A piston divides the interior of the cylinder into a first working chamber and a second working chamber. The piston having a first piston rod extending through the first working chamber and through the first end plate in a sealed manner, a free end of the first piston rod being fixed to the movable component or a stationary component, and a second piston rod extending through the second working chamber and through the second end plate in a sealed manner.

14 Claims, 3 Drawing Sheets

(56) References Cited

U.S. PATENT DOCUMENTS

| | | | |
|---|---|---|---|
| 5,538,117 A * | 7/1996 | Bouchez | B60N 2/522 188/269 |
| 5,558,190 A * | 9/1996 | Chang | A63B 21/0087 188/285 |
| 6,098,966 A * | 8/2000 | Latvis, Jr. | F16F 13/00 267/221 |
| 8,579,311 B2 * | 11/2013 | Butlin, Jr. | B60G 3/01 267/136 |
| 2004/0222579 A1 * | 11/2004 | Adoline | F16F 9/0218 267/250 |
| 2005/0016803 A1 * | 1/2005 | Brummitt | F16F 9/0218 188/284 |
| 2012/0098174 A1 * | 4/2012 | Ruan | B60N 2/24 267/131 |

FOREIGN PATENT DOCUMENTS

| | | |
|---|---|---|
| CN | 102015338 A | 4/2011 |
| DE | 1888928 U | 3/1964 |
| DE | 3322796 A1 | 1/1985 |
| DE | 102008048362 A1 | 3/2010 |
| JP | S4844536 U | 6/1973 |
| JP | S5036992 U | 4/1975 |
| JP | S531764 A | 1/1978 |
| JP | H01145224 A | 6/1989 |

* cited by examiner

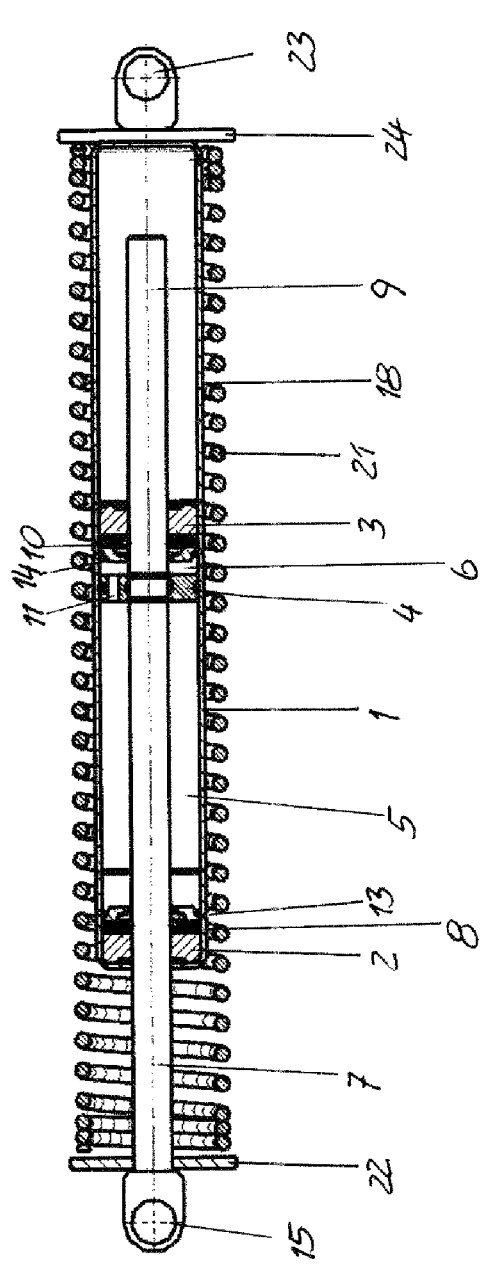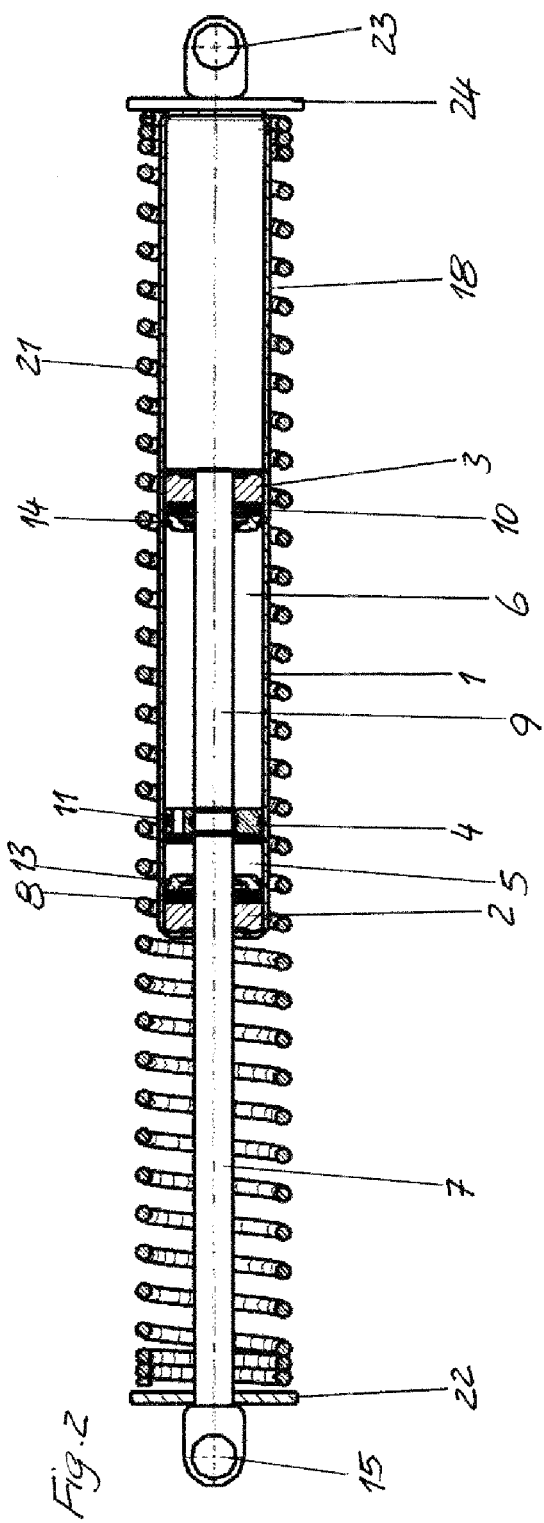

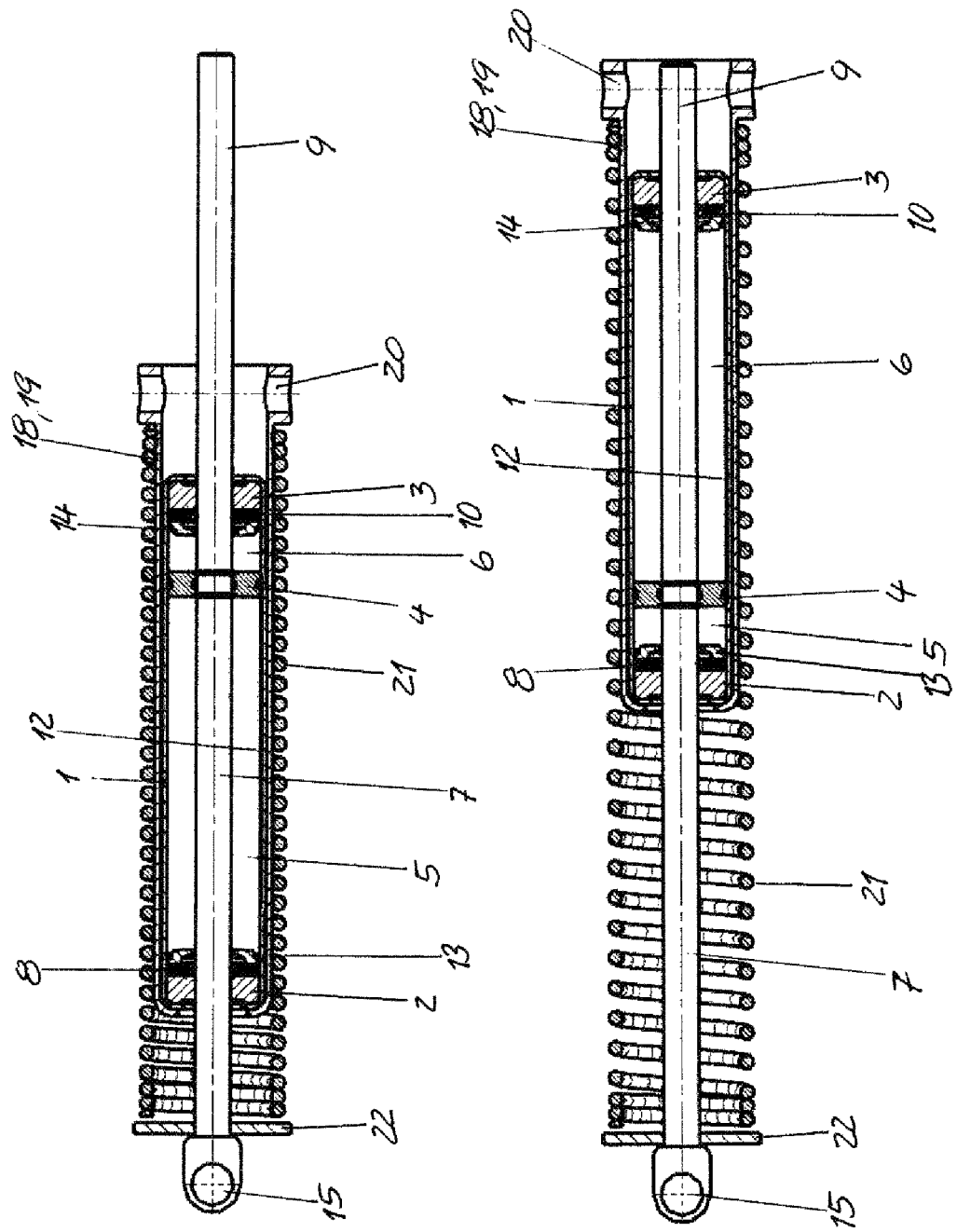

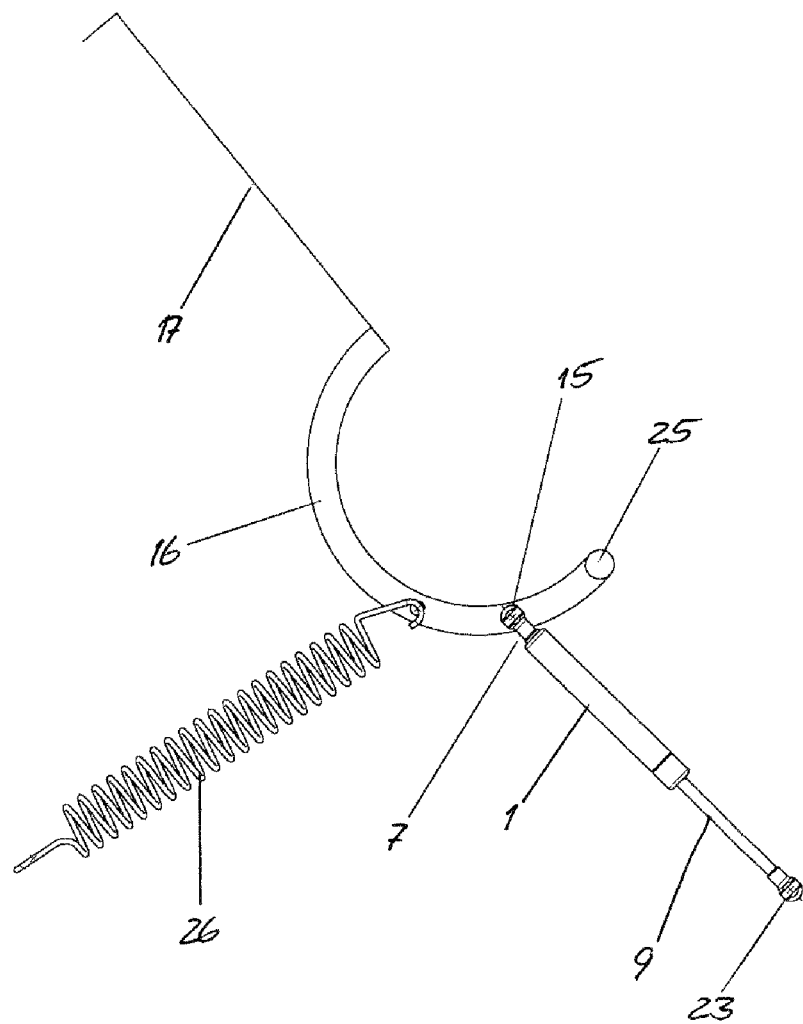
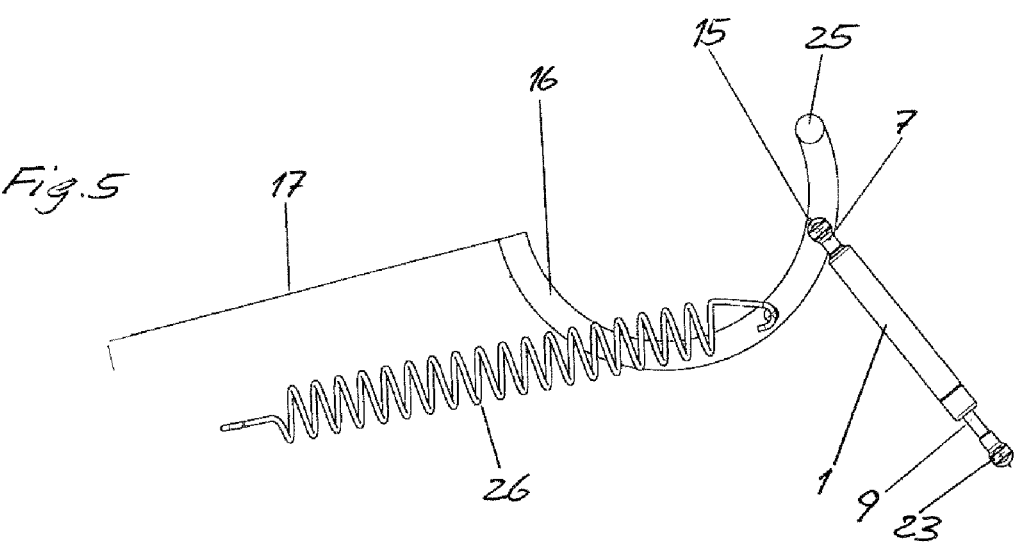

SPRING DEVICE

CROSS-REFERENCE TO RELATED APPLICATIONS

This application claims priority to DE 10 2016 116 519.0, filed on Sep. 5, 2016.

BACKGROUND OF THE INVENTION

The invention relates to a spring device for the motion drive of a movable component from a rest position into a displaced position. The inventive spring device includes a preloaded spring and a gas spring. The movable component is loaded into the displaced position by the preloaded spring. A pressurized gas-filled cylinder of the gas spring include a first end closed by a first end plate and a second end closed by a second end plate and the interior of which is subdivided by an axially displaceable piston into a first working chamber and a second working chamber. The first working chamber and the second working chamber are connected to each other via a restrictor, and the piston has a piston rod which is led through the first working chamber and is led to the outside through the first end plate in a sealed manner, the piston rod having a free end being fixed to the movable component or a stationary component.

In such spring devices, the extension force is composed of a sum of the force of the preloaded spring and the force component of the gas spring that is present in the extension direction, which is primarily intended to effect damping of the extension movement of the piston rod. The damping force depends on the pressure of the gas in the cylinder. As the pressure rises, the damping force also rises.

As resistances of the components to be moved increase, the forces of the spring must also increase. This alone requires a high expenditure of force for the manual movement of the movable component out of the displaced position into the rest position. If increased damping of the movement from the rest position into the displaced position is also intended to be provided, the increased damping further increases the required expenditure of force.

BRIEF SUMMARY OF THE INVENTION

An object of the invention is to provide a spring device in which a reduced expenditure of force is required to displace the component to be moved from the displaced position into the rest position.

The object is met by a spring device for the motion drive of a movable component from a rest position into a displaced position, comprising a gas spring and a preloaded spring configured to urge the movable component into the displaced position. The gas spring includes a pressurized gas-filled cylinder with a first end closed by a first end plate and a second end closed by a second end plate, and an axially displaceable piston subdividing an interior of the cylinder into a first working chamber and a second working chamber. The first working chamber and the second working chamber are connected to each other via a restrictor. A first piston rod is connected to the piston and extends through the first working chamber, the first piston rod being led to the outside of the cylinder through the first end plate in a sealed manner, and the first piston rod having free end connectable to the movable component or a stationary component. A second piston rod is connected to the piston and extends through the second working chamber, the second piston rod being led to the outside of the cylinder through the second end plate in a sealed manner.

This embodiment achieves at least broad equality of the effectively loaded surfaces of the piston on its two sides, so that the gas spring no longer contributes any force to the displacement from the rest position into the displaced position. Therefore, the force to be applied manually to move the movable component from the displaced position into the rest position is also reduced.

Since the gas spring is at least largely force-neutral, it can also be designed for increased damping of the movement from the rest position into the displaced position without needing an increased expenditure of force in the opposite direction of movement.

Increased damping with the same cross section of the restrictor is achieved by increasing the pressure of the gas in the interior of the cylinder. With such an adjustment of the pressure of the gas in the cylinder, with an otherwise identical spring device, damping of the movement from the rest position into the displaced position and vice versa, desired by customers, is achieved in a simple way.

In an application of the spring device in a motor vehicle, functional reliability must be ensured in a temperature range between −30° C. and +80° C. Since the volume of the gas in the gas spring wishes to increase or decrease in the event of a temperature change but cannot due to the constant volume of the interior of the cylinder, the pressure in the cylinder would decrease or increase with the temperature change. At high temperatures, this would lead to such an additional force for moving the movable component from the displaced position into the rest position that such a movement would no longer be possible or possible only with the application of a very high manual force.

Since, in the spring device according to the invention, there is force equilibrium of the gas spring, there is at least largely no influence on the movement from the rest position into the displacement position either in the event of temperature changes.

This force equilibrium is optimized still further if the first piston rod and the second piston rod have the same cross section.

The restrictor can be arranged in any type of connection between the first working chamber and the second working chamber.

No additional installation space is required if the restrictor is a restrictor bore formed passing axially through the piston or an axial restrictor groove in the inner wall of the cylinder.

If the restrictor groove has a different cross section over its length, then the restrictor groove can have a different damping profile over the movement path from the displaced position into the rest position.

Depending on the requirement and the available installation space, the spring can be a mechanical tension spring or a compression spring. These springs can act at an extremely wide range of locations on the movable component or a component connected to the movable component.

A compact structure is achieved by the spring being a helical compression spring, which encloses the cylinder and the first piston rod coaxially with a radial clearance and is supported by its first end on a region of the first piston rod projecting out of the cylinder, and is supported by its second end on the cylinder or a component connected to the cylinder.

If a guide tube connected coaxially to the cylinder extends from the cylinder in the direction of extent of the second piston rod, then the second piston rod projecting into the interior of the guide tube is protected against damage. Furthermore, at least to a large extent, it is not possible either for the second piston rod to be inadvertently loaded by a third force and for the function of the spring device to be influenced.

If, apart from the cylinder, the helical compression spring also encloses the guide tube with a radial clearance, then it is at least largely secured against buckling.

The movable component can be a flap that can be pivoted about a pivot axis, to which the first piston rod and the spring are attached directly or indirectly, in each case at a distance from the pivot axis.

Here, the pivot axis preferably extends horizontally. Furthermore, the pivot axis preferably extends along an edge of the flap.

The flap can be a flap of a vehicle.

BRIEF DESCRIPTION OF THE DRAWINGS

Exemplary embodiments of the invention are illustrated in the drawing and will be described in more detail below. In the drawings:

FIG. 1 is a longitudinal sectional view of a spring device in a rest position according to a first embodiment of the present invention;

FIG. 2 is a longitudinal sectional view of the spring device according to FIG. 1 in a displaced position;

FIG. 3 is a longitudinal sectional view of a spring device in the rest position according to a second embodiment of the present invention;

FIG. 4 is a longitudinal sectional view of the spring device according to FIG. 3 in the displaced position;

FIG. 5 is a side view of a spring device in the rest position according to third embodiment of the present invention; and FIG. 6 is a side view of the spring device according to FIG. 5 in the displaced position.

DETAILED DESCRIPTION OF THE PREFERRED EMBODIMENTS

The spring devices illustrated in the figures have a cylinder 1, the interior of which is filled with a gas under pressure. The cylinder 1 is closed at its first end by a first end plate 2 and at its second end by a second end plate 3. A piston 4 is arranged in the cylinder 1 such that the piston 4 can be displaced axially and divides the interior of the cylinder 1 into a first working chamber 5 and a second working chamber 6.

Arranged on the piston 4 is a first piston rod 7, which extends coaxially through the first working chamber 5 and is led to the outside of the cylinder 1 in a manner sealed off by a first guiding and sealing unit 8.

Also arranged on the piston 4 is a second piston rod 9 of the same cross section as the first piston rod 7, which extends coaxially through the second working chamber 6 and is led to the outside of the cylinder 1 in a manner sealed off by a second guiding and sealing unit 10.

A first supporting disk 13 rests on the side of the first end plate 2 that faces the first working chamber 5, and a second supporting disk 14 rests on the side of the second end plate 3 that faces the second working chamber 6. In the end positions of the stroke of the piston 4, the piston 4 comes into contact with the first supporting disk 13 and, respectively, with the second supporting disk 14.

In the embodiments of FIGS. 1 to 4, a first spherical cup 15 is arranged at the free end of the first piston rod 7 as a first fixing element, with which the first piston rod 7 is attached to a flap (not illustrated) of a vehicle.

In embodiment of FIGS. 1 and 2, the cylinder 1 extends coaxially beyond the second end plate 3 and forms a guide tube 18, into which the second piston rod 9 projects and at the end of which there is arranged a second spherical cup 23 forming a second fixing element, by means of which the guide tube 18 firmly connected to the cylinder 1 is attached to a body part (not illustrated) of the vehicle.

In the embodiment of FIGS. 3 and 4, the cylinder 1 is inserted into an outer tube 19, which extends beyond the second end plate 3 and, with its region extending over the second end plate 3, forms a guide tube 18, into which the second piston rod 9 projects. Arranged at the free end of the guide tube 18 is a second fixing element 20, by means of which the guide tube 18 firmly connected to the cylinder 1 is arranged on a body part (not illustrated) of the vehicle.

In the embodiments of FIGS. 1 to 4, the cylinder 1 and guide tube 18 are enclosed with a radial clearance by a helical compression spring 21 that is under preload.

The helical compression spring 21 is supported by its first end on the first spherical cup 15 via a first supporting disk 22. The helical compression spring 21 in FIGS. 1 and 2 is supported by its second end via a second supporting disk 24 on a second spherical cup 23 and, in FIGS. 3 and 4, on the second fixing element 20.

In the embodiment of FIGS. 5 and 6, a first spherical cup 15 as first fixing element is arranged at the free end of the first piston rod 7, with which the first piston rod 9 is attached by an arcuate intermediate piece 16 connected by its one end to a flap 17. The other end of the intermediate piece 16 is mounted on the body of the vehicle such that it can pivot about a horizontal pivot axis 25.

The first spherical cup 15 is in this case attached to the intermediate piece 16 at a radial distance from the pivot axis 25.

Likewise, at a radial distance from the pivot axis 25, a preloaded tension spring 26 acts with its one end on the intermediate piece 16, and is arranged with its other end on a component (not illustrated) of the body.

The cylinder 1 and the tension spring 26 extend at right angles to the pivot axis 25. Cylinder 1 and tension spring 26 can also extend at an angle less than 90° relative to each other.

At its free end, the second piston rod 9 has a second spherical cup 23, with which the second piston rod 9 is attached to a part (not illustrated) of the body of the vehicle.

In the embodiment of FIGS. 1 and 2, a restrictor bore 11 is formed in the piston, connecting the first working chamber 5 and the second working chamber 6 to each other.

In the embodiment of FIGS. 3 and 4, an axial restrictor groove 12 is formed in the inner wall of the cylinder 1, extending over the length of the interior of the cylinder 1.

The interior of the cylinder 1 of FIGS. 5 and 6 has the same construction as the interior of the FIGS. 1 and 2 or 3 and 4.

During an axial movement of the piston 4 and the first piston rod 7 in the extension direction of the first piston rod 7, gas is displaced from the first working chamber 5 into the second working chamber 6 via the restrictor bore 11 or the restrictor groove 12 and, during a movement of the piston 4 in the retraction direction during an axial movement of the piston 4 and the first piston rod 7 in the retraction direction of the first piston rod 7, gas is displaced from the second working chamber 6 into the first working chamber 5 via the restrictor bore 11 or the restrictor groove 12. Here, the movement of the piston 4 is damped by the restrictor bore 11 or the restrictor groove 12.

LIST OF REFERENCE SYMBOLS

1 Cylinder
2 First end plate
3 Second end plate
4 Piston
5 First working chamber
6 Second working chamber
7 First piston rod
8 First guiding and sealing unit
9 Second piston rod
10 Second guiding and sealing unit
11 Restrictor bore
12 Restrictor groove
13 First supporting disk
14 Second supporting disk
15 First spherical cup
16 Intermediate piece
17 Flap
18 Guide tube
19 Outer tube
20 Second fixing element
21 Helical compression spring
22 First supporting disk
23 Second spherical cup
24 Second supporting disk
25 Pivot axis
26 Tension spring

The invention claimed is:

1. A spring device for the motion drive of a movable component from a rest position into a displaced position, comprising:
a preloaded spring configured to urge the movable component from the rest position of the movable component into the displaced position of the movable component, the preloaded spring is under a greater tension in the rest position than in the displaced position,
a gas spring including a pressurized gas-filled cylinder filled with a gas under pressure, the cylinder having a first end closed by a first end plate and a second end closed by a second end plate, the gas spring further including an axially displaceable piston subdividing an interior of the cylinder into a first working chamber and a second working chamber, the first working chamber and the second working chamber being connected to each other via a restrictor, a first piston rod connected to the piston and extending through the first working chamber, the first piston rod being led to the outside of the cylinder through the first end plate in a sealed manner, the first piston rod having free end connectable to one of the movable component or a stationary component, and a second piston rod connected to the piston and extending through the second working chamber, the second piston rod being led to the outside of the cylinder through the second end plate in a sealed manner, wherein the first piston rod and the second piston rod have the same cross section, and
wherein the piston interacts with the first end plate at the displaced position of the movable component and interacts with the second end plate in the rest position of the movable component.

2. The spring device according to claim 1, wherein an end of the cylinder that faces away from the first piston rod is connectable to the other of the movable component or the stationary component.

3. The spring device according to claim 1, wherein the free end of the second piston rod is connectable to the other of the movable component or the stationary component.

4. The spring device according to claim 1, wherein the restrictor is a restrictor bore passing axially through the piston.

5. The spring device according to claim 1, wherein the restrictor is an axial restrictor groove in the inner wall of the cylinder.

6. The spring device according to claim 1, further comprising a guide tube connected coaxially to the cylinder and extending from the cylinder on a side of the cylinder facing away from the first piston rod.

7. The spring device according to claim 1, wherein the movable component is a flap that can be pivoted about a pivot axis, the first piston rod and the preloaded spring are connected to the flap or to a component connected to the flap, in each case at a distance from the pivot axis.

8. The spring device according to claim 1, wherein the preloaded spring is a mechanical tension spring.

9. The spring device according to claim 1, wherein the preloaded spring is a compression spring.

10. The spring device according to claim 9, wherein the compression spring is a helical compression spring, which encloses the cylinder and the first piston rod coaxially with a radial clearance and includes a first end supported on a region of the first piston rod projecting out of the cylinder and a second end supported on the cylinder or a component connected to the cylinder.

11. The spring device according to claim 6, wherein the preloaded spring is a helical compression spring that encloses the guide tube with a radial clearance.

12. The spring device according to claim 1, further comprising a first supporting disk resting on a side of the first end plate that faces the first working chamber and a second supporting disk resting on a side of the second end plate that faces the second working chamber, the piston contacts the first supporting disk in the displaced position and the piston contacts the second supporting disk in the rest position.

13. The spring device according to claim 6, wherein a free end of the second piston rod is disposed in the guide tube.

14. The spring device according to claim 1, wherein the free end of the first piston rod has a first connection element and the free end of the first piston rod is connectable to the one of the movable component or the stationary component by the first connection element, the end of the cylinder that faces away from the first piston rod has a second connection element and is connectable to the other of the movable component or the stationary component by the second connection element, and a free end of the second piston rod is a floating end.

* * * * *